April 7, 1970 P. G. J. BARTEN 3,504,599
OPTICAL SYSTEM FOR USE IN MAKING COLOR-PHOSPHOR MOSAIC SCREENS
Filed Dec. 20, 1966 3 Sheets-Sheet 1

INVENTOR.
PIET G. J. BARTEN
BY
AGENT

INVENTOR.
PIET G. J. BARTEN
BY
AGENT

United States Patent Office 3,504,599
Patented Apr. 7, 1970

3,504,599
OPTICAL SYSTEM FOR USE IN MAKING COLOR-PHOSPHOR MOSAIC SCREENS
Piet Gerard Joseph Barten, Emmasingel, Eindhoven, Netherlands, assignor, by mesne assignments, to U.S. Philips Corporation, New York, N.Y., a corporation of Delaware
Filed Dec. 20, 1966, Ser. No. 604,527
Int. Cl. G03
U.S. Cl. 95—1                1 Claim

ABSTRACT OF THE DISCLOSURE

A device for projecting a pattern of symmetrical arranged apertures in a color selection mask onto a display screen for a color television display tube. This device includes a lens system positioned between a light source and the mask whose strength varies in the radial direction from its optical axis. The virtual image of the light source produced by the annular zone of the lens system undergoes a substantially equal displacement parallel to the optical axis as that which the center of deflection of the electron beam undergoes in a direction parallel to the axis of the tube as a function of the instantaneous angle of deflection of the electron beam. The strength of the lens system in a radial direction from its optical axis varies so that the vertical image of the light source produced by the annular zone of the lens system undergoes a displacement in the direction of the eccentricity of the light source relative to the optical axis which, together with any real displacement of the light source in this direction, is substantially equal to the mean displacements which the centers of deflection of the electron beam undergoes along this annular zone in the direction of the eccentricity of the beam relative to the axis of the tube as a function of the instantaneous angle of deflection of the electron beam.

---

This invention relates to devices for optically projecting a pattern of systematically arranged apertures in a color selection mask for a color television display tube onto a radiation-sensitive layer on the window from a punctiform light source. This projection is substantially equal to the electron-optical projection of a similar pattern on the screen present on the window of the color television display tube by means of an electron beam scanning the mask by the action of a deflection coil system. The mask for this purpose occupies the same position relative to the radiation-sensitive layer as that which the mask occupies relative to the screen in the display tube, and the punctiform light source is arranged so tha the light rays emitted therefrom pass through the apertures in the mask at substantially the same angle as the electron beam in the display tube. A lens system is arranged between the light source and the mask having a strength which varies in the radial direction from its optical axis so that the virtual image of the light source produced by the associated annular zone of the lens system undergoes a substantially equal displacement parallel to the optical axis as that which the center of deflection of the electron beam undergoes in a direction parallel to the axis of the tube as a function of the instantaneous angle of deflection of the electron beam.

The screen of, for example, a three-color television display tube is manufactured with the aid of such a device. Such a three-color television display tube includes an electrode system producing three electron beams the electrons of which travel along paths which are in different angular relationship to one another through the apertures in the mask towards the screen for producing the various respective colors. The positions of the luminescent elements on the screen are determined by using a photographic process in which the apertured mask serves as the negative and is arranged in the same position relative to the radiation-sensitive layer as that which the mask will occupy relative to the screen in the completed tube. The various radiation-sensitive layers are successively illuminated each from a point which occupies the same position relative to the mask and the layer as that which the centers of deflection of the various electron beams will occupy relative to the mask and the screen in the completed tube. After each illumination the unhardened portions of the radiation-sensitive layer are removed.

When the angle of deflection of an electron beam increases by the action of a deflection coil system the center of deflection of the electron beam moves closer to the screen. However, the light used for determining the positions of the luminescent elements originates from a stationary source so that the light rays will not pass the apertures in the mask at the same angle as the deflecting electron beam afterwards in the display tube because of the displacement of the center of deflection of the electron beam upon deflection of the latter. In order to meet this disadvantage a lens system is arranged between the light source and the mask having a strength which varies in the radial direction from its optical axis and this in such manner that the virtual image of the light source produced by the associated annular zone of the lens system undergoes a substantially equal displacement parallel to the optical axis as that which the center of deflection of the electron beam undergoes in a direction parallel to the axis of the tube as a function of the instantaneous angle of deflection of the electron beam.

The various electron beams are converged on the mask by the action of a convergence system. Since in practice the distance between the center of curvature of the mask and the mask is larger than the distance between the centers of deflection of the various electron beams and the masks, the path leading to the mask increases as the beams are deflected more strongly so that, unless special steps are taken, the beams already intersect in front of the mask. Furthermore, the deflection coil usually employed in practice has a converging action which increases with the angle of deflection and is such that the beams intersect at a still greater distance in front of the mask. In most cases the latter case is predominant. In order to converge the various electron beams on the mask even when they have been deflected, the convergence system will have to be matched and this is a function of the deflection. This is termed "dynamic" convergence." As a result thereof the center of deflection of each electron beam undergoes a displacement, as a function of the angle of deflection, in the direction of the eccentricity of the beam relative to the axis of the tube. When regarded from the axis of the tube and also from the axis which coincides with the undeflected beam, said displacement for each electron beam is not rotation-symmetrical. For this displacement of the center of deflection of the electron beam is would be possible for the image of the light source to be corrected to a certain extent by giving the light source an actual displacement in the direction of the eccentricity of the electron beam. The matching is thus improved for large angles of deflection at the expense of the matching at the center of the tube. On the other hand, it is possible to correct the virtual image of the light source and, to this end, the lens system is rotation-asymmetrical in a certain way. A combination of both is also possible.

For correction in connection with the displacement of the centers of deflection in the direction parallel to the axis of the tube and in the direction of the eccentricity of the electron beam when the light source is arranged on the axis of the undeflected electron beam it has been suggested to use a lens which is flat on one side and the profile of which on the other side is given by $$t = f_1(r) + f_2(r) \cos \vartheta \tag{1}$$

where $t$ is the thickness of the lens at the point determined by the distance $r$ from the axis of the lens and by the azimuthal angle $\vartheta$ with the direction of the eccentricity of the optical axis relative to the axis of the tube. $f_1(r)$ and $f_2(r)$ are analytic functions of $r$. The displacement of the virtual image of the light source in the direction of said eccentricity which may be obtained with such a lens is not constant along an annular zone of the lens and will be considerably smaller for azimuthal angles of 90° and 270° than for azimuthal angles of 0° and 180°. However, by the action of the usual deflection coil system and the dynamic convergence system, the center of deflection of the electron beam undergoes for azimuthal angles of 90° and 270° a displacement in the direction of the eccentricity of the beam relative to the axis of the tube which is the same and for a certain beam even larger than the displacement for azimuthal angles of 0° and 180°. However, a lens which would produce such a displacement of the virtual image of the light source has the disadvantage that the "screen filling" obtained is unfavorable. The term "screen filling" is to be understood to mean the distribution of the luminescent elements in the screen and this is regarded to be advantageous if, on the one hand, a minimum of the screen does not contain luminescent elements and, on the other hand, the luminescent elements do not overlap.

The invention is based upon the discovery that in practice it is possible to meet conflicting requirements which occur especially for certain portions of the screen. Namely, there is a smaller displacement in the direction of the eccentricity for azimuthal angles of 90° and 270° than for azimuthal angles of 0° and 180° in order to obtain satisfactory screen filling and, a larger displacement for the same angles in order to cause coincidence of the center of the luminescent element and the center of the electron dot such as occurs especially with the beam having an eccentricity at right angles to the direction of scanning. The latter is caused by the deflection coils usually employed.

According to the invention the strength of the lens system varies in the radial direction from its optical axis so that the virtual image of the light source produced by the associated annular zone of the lens system undergoes a displacement in the direction of the eccentricity of the light source relative to the axis of the tube. This displacement together with any real displacement of the light source in this direction, is substantially equal to the mean displacements which the centers of deflection of the electron beams undergo along this annular zone in the direction of the eccentricity of the beams relative to the axis of the tube as a function of the instantaneous angles of deflection of the electron beams.

The invention also relates to a method of manufacturing a color television display tube including a deflection coil system which tube possesses a color selection mask having a pattern of systematically arranged apertures and a screen covered with a mosaic of elements which become luminescent in various colors upon incidence of electrons, wherein a device according to the invention is used for determining the positions of the elements of the mosaic pattern on the screen.

The invention also relates to a color television display tube manufactured by this method.

In particular the lens system comprises a single lens for which the following must apply: If $t$ is the thickness of the lens, flat on one side, at the point determined by the distance $r$ from the axis of the lens and by the azimuthal angle $\vartheta$ made with the direction of the eccentricity of the optical axis of the lens relative to the axis of the tube, then in view of the properties to be obtained, the derivatives $\partial t/\partial r$ and $\partial t/\partial \vartheta$ must satisfy certain conditions.

$$\frac{\partial t}{\partial r} = \frac{\cos \phi \, (r - \overline{\Delta s} \cos \vartheta) - (l_o - \Delta p + t) N \sin \beta}{(l_o - \Delta p + t)(N \cos \beta - \cos \phi)} \tag{2}$$

$$\frac{\partial t}{\partial \vartheta} = \frac{\cos \phi \overline{\Delta s} r \sin \vartheta}{(l_o - \Delta p + t)(N \cos \beta - \cos \phi)} \tag{3}$$

where:

$\phi$ = the angle of deflection
$\overline{\Delta s}$ = the mean desired virtual displacement which the light source must undergo
$l_o$ = the distance between the light source and the flat side of the lens which is adjacent the light source
$\Delta p$ = the displacement of the center of deflection of the electron beam in the direction parallel to the axis of the tube
$N$ = the refractive index of the lens for the radiation used
$\beta$ = the angle made by the light ray in the lens and the axis of the lens.

For $\phi$ the following relationship applies:

$$\cos \phi = \frac{l_o - \Delta p + t}{\sqrt{r^2 - 2r\overline{\Delta s} \cos \vartheta + \Delta s^2 + (l_o - \Delta P + t)^2}} \tag{4}$$

and for $\beta$ we have:

$$\frac{Nl_o}{\sqrt{1 - N^2 \sin^2 \beta}} + \frac{t}{\cos \beta} = \frac{r}{\sin \beta} \tag{5}$$

However, in practice, it is generally impossible to manufacture a continuous surface for the lens which satisfies both conditions for any value of $r$ and $\vartheta$. On the basis of the condition for $\partial t/\partial r$ it is possible to form a solution $t_1$:

$$t_1(r, \vartheta) = t_o + \int_0^r \left(\frac{\partial t}{\partial r}\right) \vartheta \, dr \tag{6}$$

This solution also satisfies the conditions for $\partial t/\partial \vartheta$ only for $\vartheta = 0°$ and $\vartheta = 180°$. On the other hand, on the basis of the condition for $\partial t/\partial \vartheta$ it is possible to form a solution $t_2$:

$$t_2(r, \vartheta) = t_o + \int_0^r \left(\frac{\partial t}{\partial r}\right) \vartheta = 90° \, dr + \int_{90°}^{\vartheta} \left(\frac{\partial t}{\partial \vartheta}\right)_r d\vartheta \tag{7}$$

This solution also satisfies the conditions for $\partial t/\partial r$ for $\vartheta = 90°$ and $\vartheta = 270°$.

The thickness $t$ of the lens according to the invention which is flat on one side now satisfies the relationship:

$$t(r, \vartheta) = \cos^2 \vartheta \cdot t_1(r, \vartheta) + \sin^2 \vartheta \cdot t_2(r, \vartheta) \tag{8}$$

In this lens the assumed value for $\overline{\Delta s}$ occurs for azimuthal angles of 0°, 90°, 180°, 270°, which value differs only slightly for angles between those specified.

In a given case there was started in the manufacture of the lens from a real displacement of 0.7 mm. of the light source relative to the axis of the undeflected electron beam in the direction of the eccentricity of the electron beam and from $\overline{\Delta s} = 2.16 \sin \phi$ mm. for the mean virtual displacement of the light source in the direction of the eccentricity ($\overline{\Delta s}$). The virtual displacement of the light source in the direction of the optical axis ($\Delta p$) was assumed to be $\Delta p = 50 \tan \phi/2$ mm. For a deflection angle of 45° one thus obtained a value for the virtual displacement of the light source in the direction of the eccentricity which varied between 1.53 mms. and 1.28 mms. as a function of the azimuthal angle, while $\Delta p$ was 8.60 mms.

The invention is described in greater detail in connection with the accompanying drawings, wherein.

Figure 1:
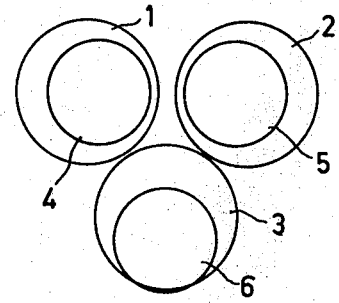
FIGS. 1, 3 and 5 are greatly enlarged views from the outside of different tubes of groups of phosphor dots near the edge of the screen on its horizontal axis.

FIG. 1 is a greatly enlarged view of a group of phosphor dots near the edge on the horizontal axis of a screen. The group comprises a green phosphor dot 1, a red phosphor dot 2 and a blue phosphor dot 3. In the method of making the screen the positions of the phosphor dots were determined by using a photographic process in which the apertured mask serves as the negative. Between the light source and the face plate of the tube on which the screen had to be applied, a lens has been placed which is flat on the one side facing the light source and the profile of which on the other side is given by $$t = f_1(r) + f_2(r) \cos \vartheta$$

where $t$ is the thickness of the lens at the point determined by the distance $r$ from the axis of the lens and by the azimuthal angle $\vartheta$ made with the direction of the eccentricity of the optical axis of the lens relative to the axis of the tube, $f_1(r)$ and $f_2(r)$ being analytic functions of $r$. Further the beam-spots in question 4, 5 and 6 are shown.

Figure 2:
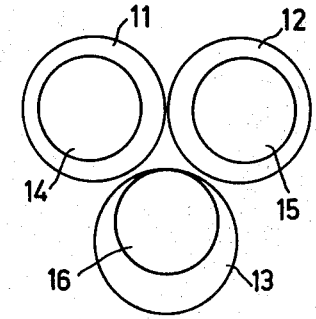
FIGS. 2, 4 and 6 are greatly enlarged views from the outside of different tubes of groups of phosphore dots near the edge of the screen on its vertical axis.

FIG. 2 is a greatly enlarged view of a group of phosphor dots near the edge on the vertical axis of the screen referred to in the description of FIG. 1. The group comprises a green phosphor dot 11, a red phosphor dot 12 and a blue phosphor dot 13, while further the beam-spots in question 14, 15 and 16 are shown.

The eccentricity of the light source for the blue phosphor dots was in the vertical direction above the axis of the tube. Thus for the blue phosphor dots the azimuthal angle $\vartheta$ of FIG. 1 is 90° or 270° and that of FIG. 2 0° or 180°. In FIG. 1 the lower side of the beam-spot 6 lies partly outside the blue phosphor dot 3. In FIG. 2 the upper side of the beam-spot 16 touches the blue phosphor dot 13. From the position of the blue phosphor dots 3 and 13 it can be deduced that the displacement of the virtual image of the light source obtained with the lens in the direction of the eccentricity is considerably smaller for azimuthal angles of 90° and 270° than for azimuthal angles of 0° and 180°. However, the action of the deflection coil system and the dynamic convergence system is such that the center of deflection of the electron beam of the blue gun undergoes for azimuthal angles of 90° and 270° a displacement in said direction which is larger than the displacement for azimuthal angles of 0° and 180°. This illustrated by the position of the beam-spots 6 and 16.

Figure 3:
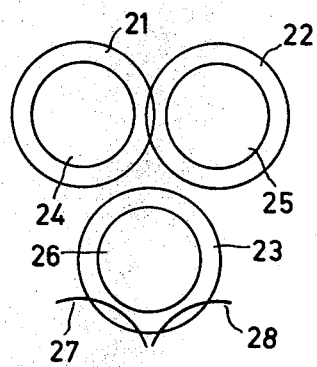
Figure 4:
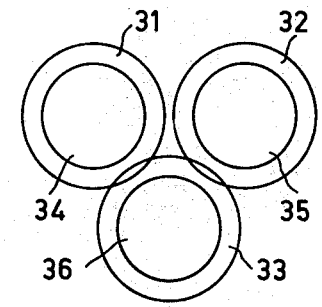

FIG. 3 is a greatly enlarged view of a group of phosphor dots near the edge on the horizontal axis of another screen and FIG. 4 is a similar view near the edge on the vertical axis of said screen. The group of FIG. 3 comprises a green phosphor dot 21, a red phosphor dot 22 and a blue phosphor dot 23 and further part of the green phosphor dot 27 and part of the red phosphor dot 28 of an adjacent group are shown. The beam-spots in question are 24, 25 and 26; their positions and size are the same as those of beam-spots 4, 5 and 6 of FIG. 1. The group of FIG. 4 comprises a green phosphor dot 31, a red phosphor dot 32 and a blue phosphor dot 33; the beam-spots in question are 34, 35 and 36; their position and size are the same as those of beam-spots 14, 15 and 16 of FIG. 2. The size of all these phosphor dots is the same as in FIGS. 1 and 2. In this case the phosphor dots are concentric with the beam-spots. However, the screen filling is unfavorable. In FIG. 4 the blue phosphor dot 33 overlaps the green phosphor dot 31 and the red phosphor dot 32 both of the same group. In FIG. 3 the green phosphor dot 21 and the red phosphor dot 22 overlap and the blue phosphor dot 23 overlaps the partly shown green phosphor dot 27 and red phosphor dot 28 of an adjacent group of phosphor dots.

Figure 5:
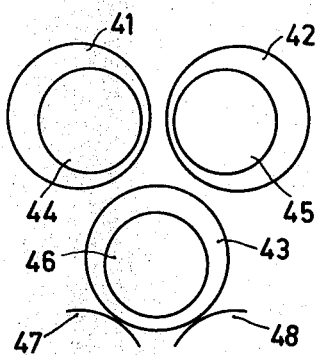
Figure 6:
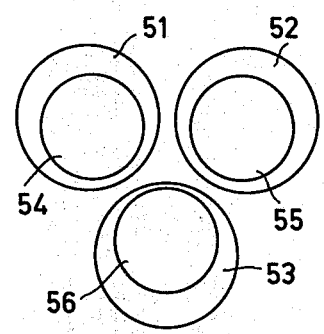

FIG. 5 is a greatly enlarged view of a group of phosphor dots near the edge on the horizontal axis of another screen and FIG. 6 is a similar view near the edge on the vertical axis of said screen. The group of FIG. 5 comprises a green phosphor dot 41, a red phosphor dot 42 and a blue phosphor dot 43 and further part of the green phosphor dot 47 and part of the red phosphor dot 48 of an adjacent group. The beam-spots in question are 44, 45 and 46; their position and size are the same as those of beam-spots 4, 5 and 6 of FIG. 1 and 24, 25 and 26 of FIG. 3. The group of FIG. 6 comprises a green phosphor dot 51, a red phosphor dot 52 and a blue phosphor dot 53; the beam-spots in question are 54, 55 and 56; their position and size are the same as those of beam-spots 14, 15 and 16 of FIG. 2 and 34, 35 and 36 of FIG. 4. The size of all these phosphor dots is the same as in FIGS. 1, 2, 3 and 4. In the method of making the screen use was made of the lens shown in FIG. 7a. In this case the screen filling is favorable since there is no overlap of the phosphor dots. Further the beam-spots lie entirely inside the phosphor dots.

Figures 7A, 7B, 7C:
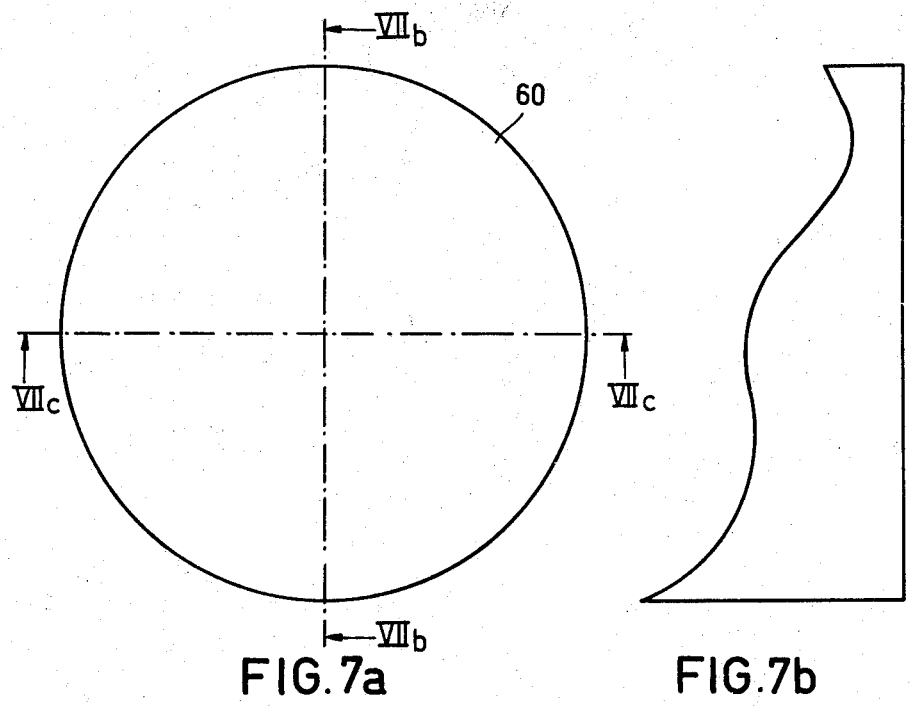
FIG. 7a is a plan view of the second or top face of the lens.
FIG. 7b is the profile of said face projected along a line 90° removed from the single line of symmetry of the lens.
FIG. 7c is the profile of said face projected along said line of symmetry.

FIG. 7a is a plan view of the second or top face of a lens 60 the strength of which varies in the radial direction from its optical axis so that the virtual image of the light source produced by the associated annular zone of the lens system undergoes a displacement in the direction of the eccentricity of the light source relative to the axis of the tube, which, together with a real displacement of the light source in this direction, is substantially equal to the mean displacements which the centers of deflection of the electron beams undergo along this annular zone in the direction of the eccentricity of the beams relative to the axis of the tube as a function of the instantaneous angles of deflection of the electron beams. The lens has a single line of symmetry VIIc—VIIc, the profile of which along said line of symmetry is shown in FIG. 7c. The profile of the lens along a line VIIb—VIIb 90° removed from said line of symmetry is shown in FIG. 7b. The diameter of the lens is 200 mm. and its thickness in the center is 10 mm. For clearness sake the profiles are shown exaggerated in the figures: the differences of the thickness in respect of the thickness in the center are shown on a scale 40 times larger than the scale on which the diameter has been drawn.

Figure 8:
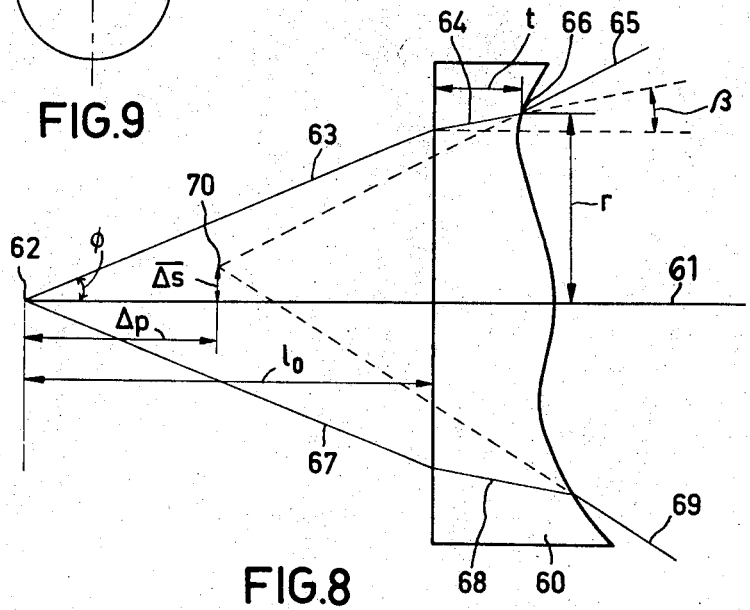
FIG. 8 is a sectional view of the lens of FIG. 7a marked with lines indicating the paths of two light rays.

In FIG. 8 the line 61 indicates the axis of the lens 60. The light source is placed at 62. The lines 63, 64 and 65 indicates the path of one light ray. This light ray leaves the lens at a point 66 where it has a thickness $t$. The distance of the point 66 from the axis of the lens is $r$. The angle made by the light ray 64 in the lens and the axis 61 of the lens is $\beta$. The distance between the light source 62 and the flat side of the lens 60 is $l_o$. The lines 67, 68 and 69 indicate the path of another light ray passing through the same zone of the lens. The light rays 65 and 69 seem to originate from the virtual light source 70. The virtual displacement of the light source in the direction parallel to the axis of the lens is $\Delta p$ and in the radial direction $\overline{\Delta s}$.

Figure 9:
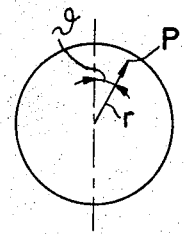
FIG. 9 is a diagram relating any point $(p)$ on the surface of the lens to the azimuthal angle $(\vartheta)$ and radius $(r)$.

The diagram of FIG. 9 relates any point $(p)$ on the surface of the lens to the azimuthal angle $(\vartheta)$ on its distance $r$ from the axis of the lens.

Figure 10:
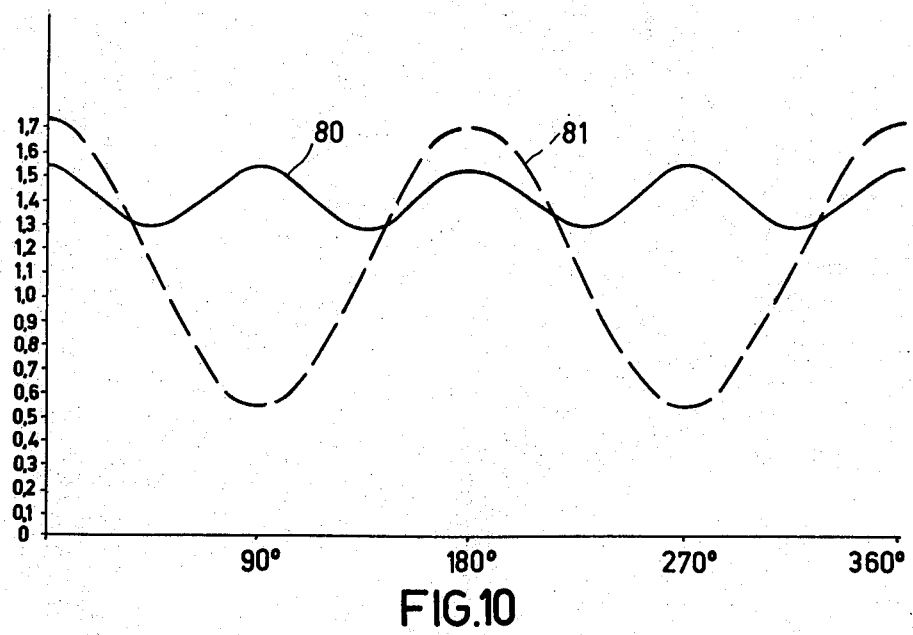
FIG. 10 is a diagram showing virtual displacements of the light source in the direction of eccentricity.

The diagram of FIG. 10 shows virtual displacement of the light source in the direction of the eccentricity for the annular zone of the lens associated with a deflection angle of about 45° as a function of the azimuthal angle. The full line 80 relates to the displacement of the light source obtained by the lens of FIG. 7a. The dash line 81 relates to that obtained by the lens referred to in the description of FIGS. 1 and 2.

What is claimed is:

1. In a device for optically projecting a pattern of systematically arranged apertures in a color selection mask for a color television display tube onto a radiation-sensitive layer on the window from a punctiform light source, the projected pattern being substantially equal to the electron-optical projection of a similar pattern on the screen present on the window of the color television display tube by means of an electron beam scanning a mask by the action of a deflection coil system, the mask for this purpose occupying the same position relative to the radiation-sensitive layer as that which the mask occupies relative to the screen in the display tube, and the punctiform light source being positioned so that the light rays emitted therefrom pass through the apertures in the mask at substantially the same angle as the electron beam in the display tube, a lens system being positioned between the light source and the mask having a strength which varies in the radial direction from its optical axis whereby the virtual image of the light source produced by the associated annular zone of the lens system undergoes a substantially equal displacement parallel to the optical axis as that which the center of deflection of the electron beam undergoes in a direction parallel to the axis of the tube as a function of the instantaneous angle of deflection of the electron beam, the strength of the lens system in the radial direction from its optical axis varying so that the vitual image of the light source produced by the associated annular zone of the lens system undergoes a displacement in the direction of the eccentricity of the light source relative to the optical axis, which, together with any real displacement of the light source in this direction, is substantially equal to the means displacements which the centers of deflection of the electron beams undergo along this annular zone in the direction of the eccentricity of the beam relative to the axis of the tube as a function of the instantaneous angles of deflection of the electron beams, said lens system comprising a lens, flat on one side, and having a thickness $t$ at a point a distance $r$ from the axis of the lens at an azimuthal angle $\vartheta$ with the direction of the ecentricity of the optical axis relative to the axis of the tube such that the following relations apply:

$$\frac{\partial t}{\partial r} = \frac{\cos \phi \, (r - \overline{\Delta s} \cos \vartheta) - (l_o - \Delta p + t) N \sin \beta}{(l_o - \Delta p + t)(N \cos \beta - \cos \phi)}$$

$$\frac{\partial t}{\partial \vartheta} = \frac{\cos \phi \overline{\Delta s} r \sin \vartheta}{(l_o - \Delta p + t)(N \cos \beta - \cos \phi)}$$

where $\phi$ is the angle of deflection, $\overline{\Delta s}$ is the mean desired virtual displacement which the light source must undergo, $l_o$ is the distance between the light source and the flat side of the lens which is adjacent the light source, $\Delta p$ is the displacement of the center of deflection of the electron beam in the direction parallel to the axis of the tube, $N$ is the refractive index of the lens for the radiation used, $\beta$ is the angle between the light ray in the lens and the axis of the lens, and $$\cos \phi = \frac{l_o - \Delta p + t}{\sqrt{r^2 - 2r\overline{\Delta s} \cos \vartheta + \overline{\Delta s}^2 + (l_o - \Delta p + t)^2}}$$

$$\frac{1}{\sin \beta} = \frac{N l_o}{\sqrt{1 - N^2 \sin^2 \beta}} + \frac{t}{\cos \beta}$$

References Cited

UNITED STATES PATENTS

| | | | |
|---|---|---|---|
| 2,885,935 | 5/1959 | Epstein et al. | 95—1 |
| 3,385,184 | 5/1968 | Ramberg et al. | 95—1 |

NORTON ANSHER, Primary Examiner

R. M. SHEER, Assistant Examiner